(No Model.) 8 Sheets—Sheet 3.
W. H. FINLAYSON.
EARTH EXCAVATOR.

No. 547,005. Patented Oct. 1, 1895.

Witnesses
Inventor:
William H. Finlayson (No Model.) 8 Sheets—Sheet 4.

W. H. FINLAYSON.
EARTH EXCAVATOR.

No. 547,005. Patented Oct. 1, 1895.

Fig. 5.

Witnesses
Inventor:
William H. Finlayson
by Atty (No Model.) 8 Sheets—Sheet 6.

W. H. FINLAYSON.
EARTH EXCAVATOR.

No. 547,005. Patented Oct. 1, 1895.

Witnesses: Inventor:
William H. Finlayson (No Model.) 8 Sheets—Sheet 7.

W. H. FINLAYSON.
EARTH EXCAVATOR.

No. 547,005. Patented Oct. 1, 1895.

(No Model.) 8 Sheets—Sheet 8.

W. H. FINLAYSON.
EARTH EXCAVATOR.

No. 547,005. Patented Oct. 1, 1895.

Witnesses:
H. G. Wieterich
Henry Orth

Inventor:
William H. Finlayson
by Henry Orth
Atty

UNITED STATES PATENT OFFICE.

WILLIAM H. FINLAYSON, OF SYDNEY, NEW SOUTH WALES.

EARTH-EXCAVATOR.

SPECIFICATION forming part of Letters Patent No. 547,005, dated October 1, 1895.

Application filed January 16, 1894. Serial No. 497,055. (No model.) Patented in New South Wales March 22, 1893, No. 4,326, and in Victoria March 28, 1893, No. 10,418.

*To all whom it may concern:*

Be it known that I, WILLIAM HENRY FINLAYSON, railway contractor, a subject of the Queen of Great Britain, residing at Sydney, in the British Colony of New South Wales, have invented new and useful Improvements in Earth-Excavators, (for which I have obtained Letters Patent in the British Colony of New South Wales, dated March 22, 1893, No. 4,326, and in the British Colony of Victoria, dated March 28, 1893, No. 10,418,) of which the following is a specification.

My invention has relation to excavators, and it has for its object a portable or self-propelling machine carrying all the operative devices and the necessary motive power, as well as a supply of water and coal for the engine-boiler, together with mechanism for adjusting the depth of excavation or cut, and with devices for removing the spoils.

To these ends the invention consists in structural features and in mechanisms and combinations of mechanisms, as will now be fully described, reference being had to the accompanying drawings, in which—

Fig. 5 is a front elevation thereof, the spoils-delivery devices being broken through.

Figure 12:
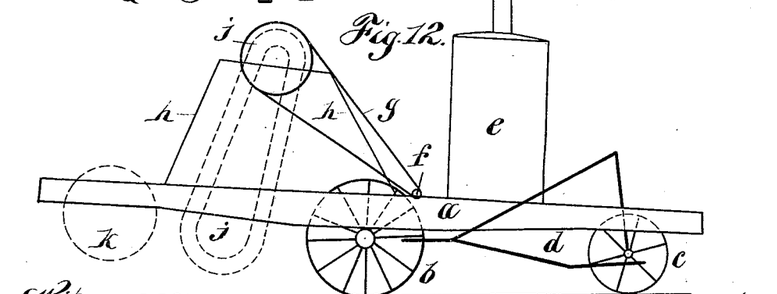
Fig. 12 is a diagrammatic elevation, illustrating the main principles of construction of an excavator according to this invention.
Figure 13:
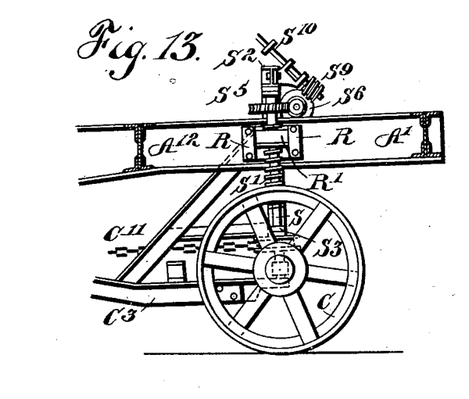
Figs. 13, 14, and 15 show by a sectional side elevation a top plan view and a sectional front elevation, respectively, a modification in the construction of the bogie-wheel frame, and the means for adjusting the same vertically.
Figure 14:
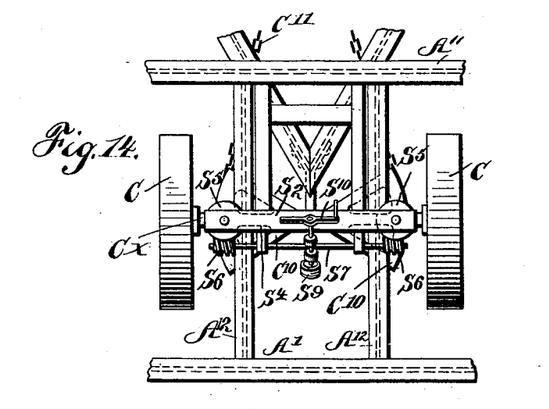
Figure 15:
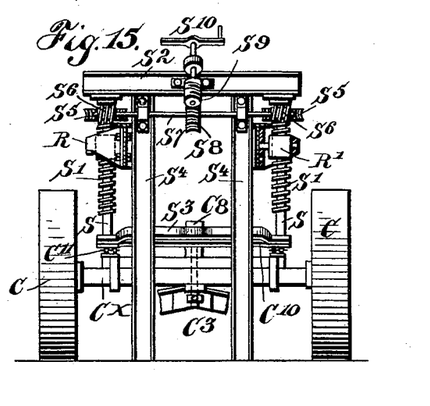

Referring primarily to Fig. 12, wherein the essential principles of construction of my improved excavator are illustrated diagrammatically, $a$ represents the main frame; $b$, the drive or draft wheels; $c$, the bogie-wheels; $d$, the bogie-supporting triangular frame; $e$, the boiler; $f$, the main shaft; $g$, the elevator driving-chain; $h$, the elevator-frame; $j$, the elevator, and $k$ the excavating implements.

I will now describe the elements above referred to, together with the operative mechanisms, referring more particularly to Figs. 1 to 7, inclusive.

Figure 3:
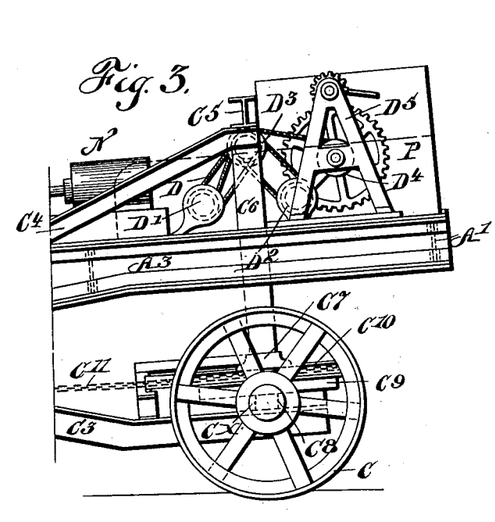
Figure 4:
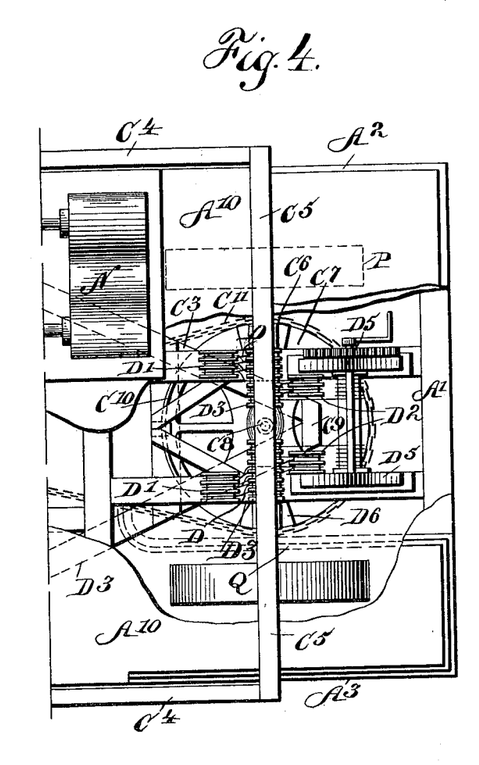

The main frame is constructed of end girders A and A', which, together with the longitudinal or side girders $A^2$ and $A^3$, form a polygonal or rectangular frame, said side girders being braced together by subsidiary cross-girders $A^4$, $A^5$, $A^6$, and $A^7$. The latter and the rear end girder are joined up by subsidiary longitudinal girders or bearers $A^8$ and $A^9$, Figs. 1 to 4, and over them, backwardly of the elevator, is a foot plate or platform $A^{10}$. To each of the side girders $A^2$ and $A^3$, just forwardly of mid-length of the main frame, is fastened the bracket B', extending downwardly as radial horn-plates $B^2$, in which slides the axle-box $B^3$, through which take journals of axle $B^\times$, of draft or main wheels B, Figs. 1, 6, and 7. The bracket B' has bottom stay-wings $B^4$, square piece $B^5$, radially shoed at bottom to take on top of axle-box and having female screw therein, while stay-wings $B^6$, bolted to girt $A^3$ and top bridge-piece $B^7$, complete said bracket. (See Fig. 7.) Through the female screw in piece $B^5$ passes male screw $B^8$, having collar $B^9$ under bridge-piece $B^7$, and also having a worm-wheel $B^{10}$ at a convenient height above gearing, into which is a worm or endless screw $B^{11}$ on one end of spindle $B^{12}$, in bearing-brackets $B^{13}$ and $B^{14}$, while on the other end is bevel-toothed wheel $B^{15}$, in gear with similar bevel-toothed wheel $B^{16}$, Fig. 2, on cross spindle or shaft $B^{17}$, in bearing-brackets $B^{14}$, said spindle $B^{17}$ carrying worm-wheel $B^{18}$, Figs. 2 and 6, in which gears worm or endless screw $B^{19}$ on spindle $B^{20}$, carried by brackets or standards $B^{21}$ and $B^{22}$, and terminating in hand-wheel $B^{23}$. The revolution of this hand-wheel, by means of the gearing just described, revolves screw $B^3$ in female screw in piece $B^5$, and causes the axle-box $B^3$ to slide in horn-plates $B^2$, so as to raise or lower the main frame from said axle $B^\times$, and the wheels $B$ to adjust the height of said frame from the ground. To each of the side girders $A^2$ and $A^3$, just rearwardly of the main axle $B^\times$, are attached bearings or brackets $C'$ for pins or pivots $C^2$ of lower diagonal leg $C^3$ of the A-frame, Fig. 1, of which the upper leg $C^4$ takes outside the main frame and terminates at cross-girder $C^5$. From girder $C^5$ base posts or stays $C^6$ depend and are fastened to fifth-wheel or quadrant-piece $C^7$, and these, together with legs $C^3$ and $C^4$, form a rigid frame for carrying the king-bolt $C^8$. The bogie-frame consists of king-bolt boss $C^9$ and chain or sprocket pulley or sheave $C^{10}$, Figs. 3 and 4. The endless chain $C^{11}$ takes around pulley $C^{10}$, Figs. 3 and 4, is crossed and passes around another chain or sprocket pulley or sheave $C^{12}$, Fig. 6, whose pivot is held in bearing-brackets $C^{13}$, and carries a worm-wheel $C^{14}$, in which gears worm or endless screw $C^{15}$ on spindle $C^{16}$ in bearing or bracket $C^{18}$, Fig. 1, and terminates in hand-wheel $C^{19}$, the revolution of which, as is easily seen, will cause the bogie-frame $C^9$ with the axle $C^\times$ and wheels $C$ to turn on the king-bolt $C^8$, and so steer the machine as it travels on main wheels $B$ and bogie-wheels $C$. The girder $C^5$ is tied to the main frame by means of cords or chains $D$ taking around the sheaves of purchase-blocks $D'$, $D^2$, and $D^3$ at either end, and thence to barrel $D^4$ of hand-winch $D^5$, Figs. 3 and 4. By revolving this winch $D^5$ the cords or chains $D$ are wound on the barrel, so as to draw or lift the back end of the main frame (on the axle $B^\times$ as a pivot, and the steering-wheels $C$ as a fulcrum) up to the girder $C^5$, and so depress the forward end of said frame for excavating; or said cords or chains $D$ are unwound, when the weight of the back end of the machine causes the main frame to lower at the back and to elevate at the front, for traveling or advancing when not excavating.

Figure 2:
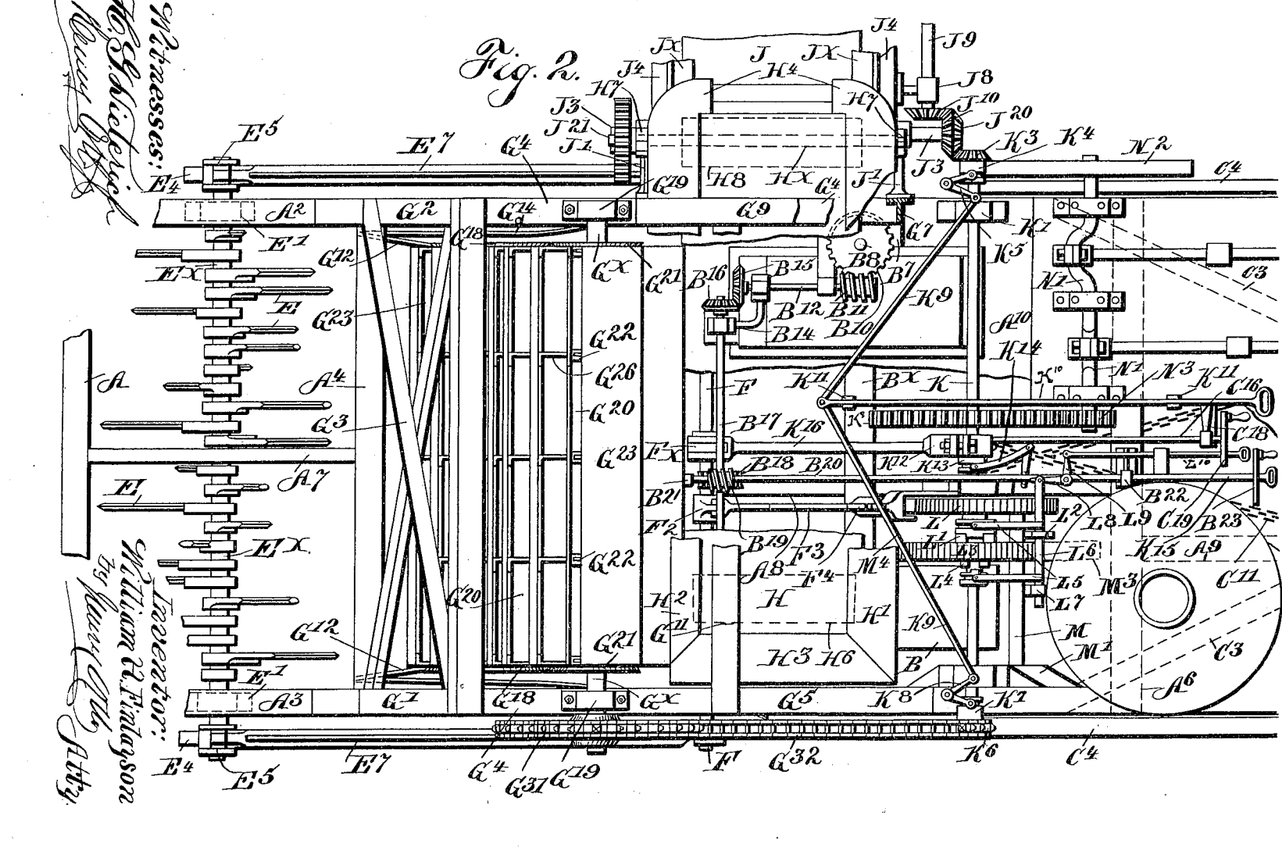
Figs. 2 and 4, conjoined, represent the machine in plan.
Figure 10:
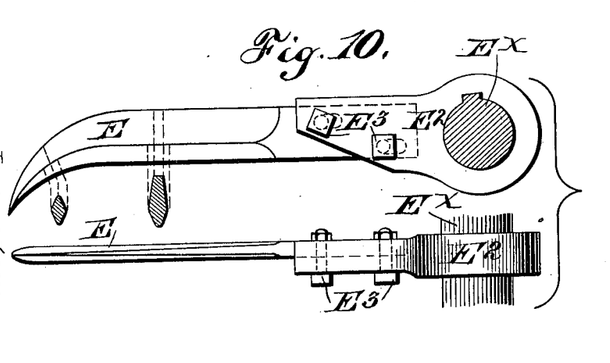
Fig. 10 illustrates one of the digging implements in side elevation, plan, and section, respectively.

The side girders $A^2$ $A^3$ and the subsidiary girder $A^7$, Fig. 2, support a plumber block or bearing $E'$ for a spindle or shaft $E^\times$, on which are threaded with radial set the bosses $E^2$, to which are attached the excavating implements or picks $E$. To this end the shaft $E^\times$ is provided with a single longitudinal feather or rib, while the several bosses $E^2$ have each a groove fitting said feather, (see Fig. 10,) the grooves of the several bosses being in different planes, so that each boss will have a radial set different from that of the contiguous bosses for purposes well understood.

Figure 1:
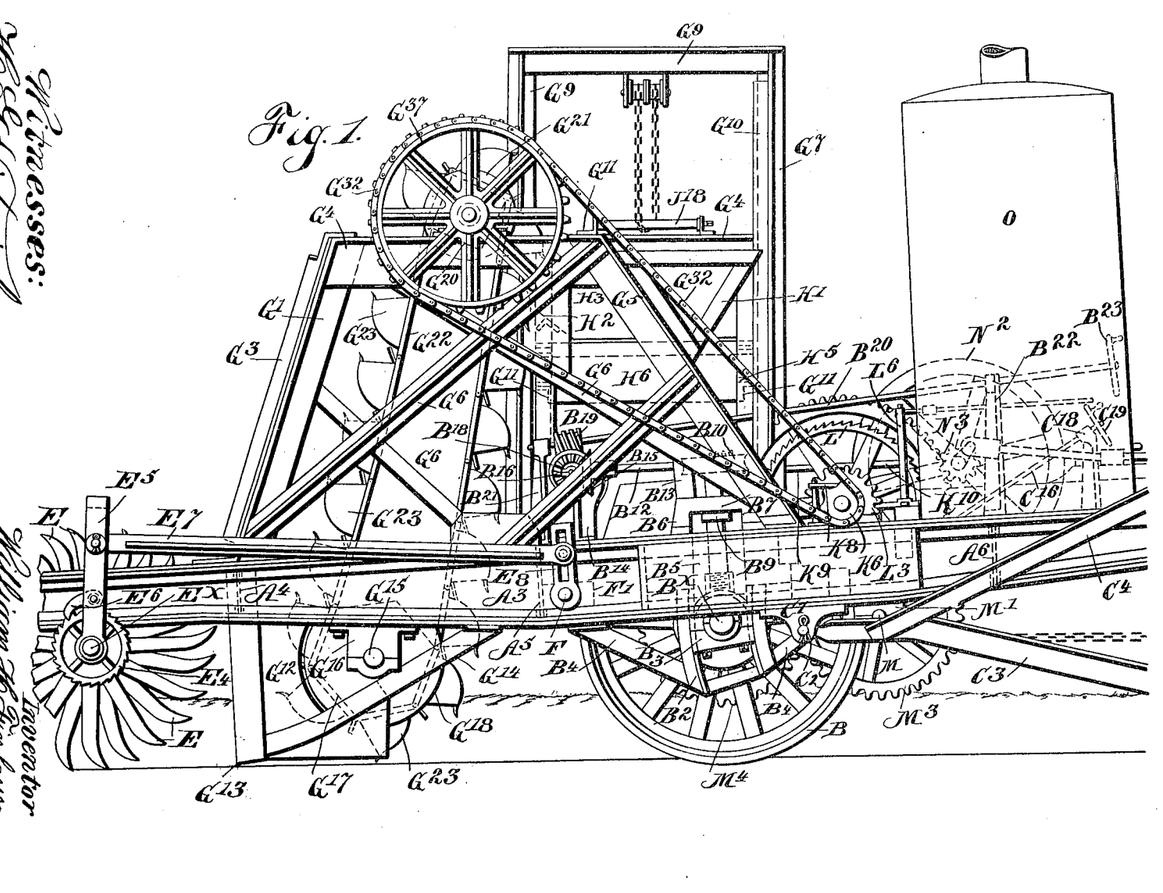
Figures 1 and 3, conjoined, illustrate my improved excavating-machine in side elevation, the coal-bunker being shown as removed and its position indicated by dotted lines.
Figure 11:
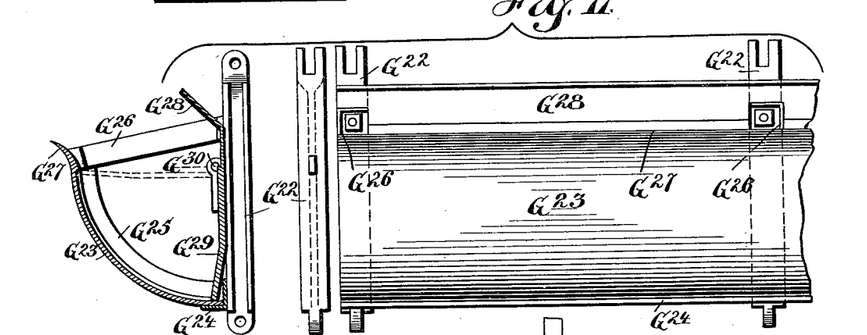
Fig. 11 illustrates one of the elevator-buckets in elevation and by a transverse sectional view.

On the outer ends of shaft $E^\times$ are ratchet-wheels $E^4$ in frames or braces $E^5$, carrying-pawls $E^6$, and having jointed thereto one end of connecting-rods $E^7$, the other end of which is jointed to slotted cranks or levers $E^8$ on the outer end of a shaft $F$ in bearings $F'$, secured to side girders $A^2$ and $A^3$, Figs. 1 and 2, and to which shaft rocking motion is imparted, as hereinafter described, and this rocking motion, by means of cranks $E^8$, rods $E^7$, and pawls $E^6$, and ratchets $E^4$, is converted into rotary motion of shaft $E^\times$, and so revolves the picks $E$. Just rearwardly, clear of the revolving picks $E$ and inclining backwardly from cross-girder $A^4$, rises the elevator-frame, consisting of side legs $G'$ and $G^2$ and cross-braces $G^3$ in front and of top pieces $G^4$ on the front and both sides of the main frame, Figs. 1, 2, and 5, while rearwardly on the blank side of said frame the back consists of legs $G^5$ and side ties or braces $G^6$, Fig. 1, and on the other or discharge side of the frame the top piece $G^4$ is extended to an upright $G^7$ and has a mid-upright $G^8$, both extending upwardly to a second top piece $G^9$ and having any necessary ties or braces, as $G^{10}$, and cross-pieces $G^{11}$, Fig. 1. Depending from the front of the frame is a gatherer or guard-plate $G^{12}$, with sharp edge $G^{13}$ and back stay $G^{14}$, Figs. 1 and 2. On a shaft or spindle $G^{15}$ in bearings $G^{16}$ on the side girders is a roller $G^{17}$, polygonal in cross-section, Fig. 1, with cheeks or disks $G^{18}$, and in bearings $G^{19}$ on top plates $G^4$ is a similar driving-roller $G^{20}$. Around rollers $G^{17}$ and $G^{20}$ are endless chains made up of links $G^{22}$, jointed together and shown in detail in Fig. 11. On these links are the elevators or buckets $G^{23}$, made up of longitudinal angle-irons $G^{24}$, curved angle-irons $G^{25}$, and stay-pieces $G^{26}$, and having curved lip $G^{27}$ and chute-plate $G^{28}$. These buckets have also radial or swinging plates $G^{29}$ hinged at $G^{30}$, so as to form ejecting pieces on the downward turning and travel of the bucket, Fig. 11. The shaft $G^\times$ of roller $G^{20}$ is driven by sprocket-wheel or chain-pulley $G^{31}$, around which travels a chain-belt $G^{32}$ from a sprocket or chain pulley $K^6$ on the end of the main shaft $K$ of the machine, Fig. 1.

Figure 5:
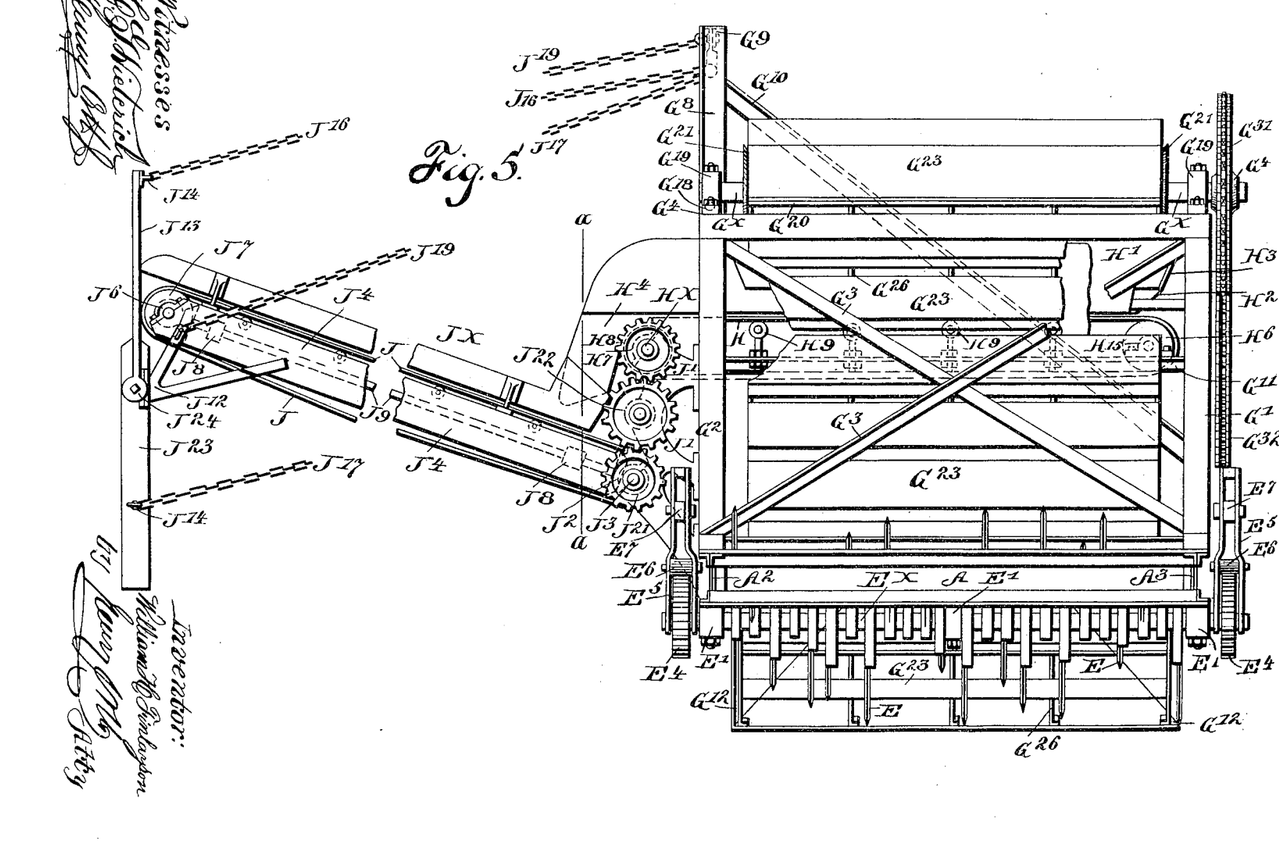
Figure 6:
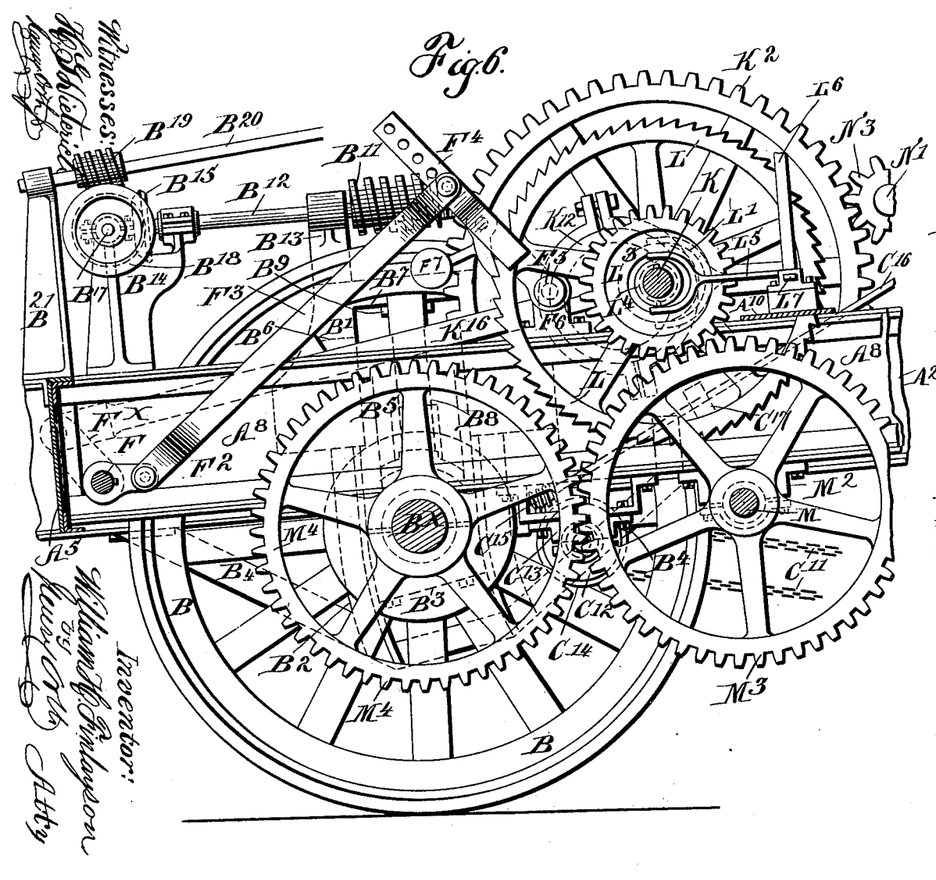
Fig. 6 is a sectional elevation, on an enlarged scale, illustrating the main parts of the gearing.
Figure 7:
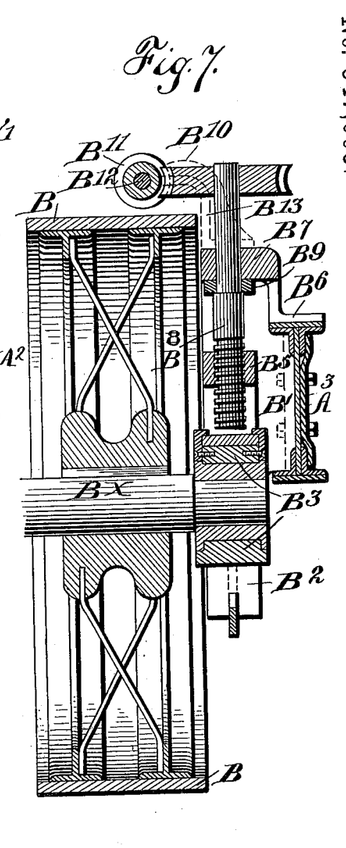
Fig. 7 is a vertical transverse sectional view, also on an enlarged scale, of one of the draft-wheels and framing of the excavator.
Figure 8:
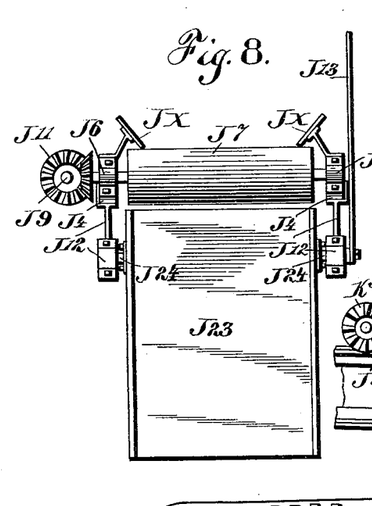
Fig. 8 is a face view of the adjustable side discharge chute or apron.
Figure 9:
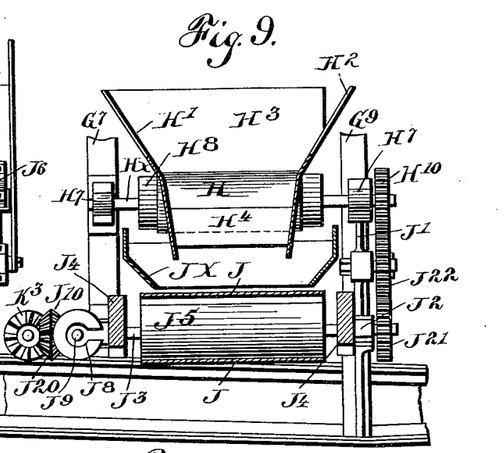
Fig. 9 is a section on line $a\,a$ of Fig. 5.

Supported by the elevator-framing is a hopper formed of sides $H'$ and $H^2$, blank end $H^3$, and tapered nose or mouth $H^4$, Fig. 9. In bearings $H^5$ on lower cross-pieces $G^{11}$ is the spindle of a back longitudinally set-roller $H^6$, (shown in dotted and full lines in Figs. 1 and 5,) respectively, and in bearings $H^7$ on upright $G^7$, and in brackets or frames $J'$ on uprights $G^8$, Figs. 2, 5, and 9, is the spindle $H^\times$ of outer roller $H^8$, Figs. 5 and 9. Around rollers $H^6$ and $H^8$ is an endless belt $H$, Figs. 2, 5, and 9, the top of which forms a bottom for the hopper, said bottom being supported by smaller rollers $H^9$, Fig. 5, and always traveling toward and downwardly around roller $H^8$ and discharging what is received thereon (from out of the buckets $G^{23}$) through the tapered nose or mouth $H^4$.

The brackets or frames $J'$, Figs. 2 and 9, support in bearings the spindle $J^3$, taking through side beams $J^4$ of discharge-frame, said spindle carrying inner roller $J^5$, Fig. 9, and said beams carrying outer bearings $J^6$, for outer roller $J^7$, Fig. 5, and side bearings $J^8$ for side spindle $J^9$, Figs. 2 and 5, which, by means of miter gearings $J^{10}$, Fig. 2, and $J^{11}$, (shown in dotted lines in Fig. 5,) communicates the motion of the inner roller $J^5$ (whose spindle is revolved by means hereinafter described) to the outer one $J^7$. Around these two rollers is endless belt J, whose upper surface has guards or sides $J^x$, Fig. 5, supported from beams $J^4$, and travels from roller $J^5$, where it receives the discharge falling through nose or mouth $H^4$ from endless belt H, and carries it over roller $J^7$, discharging it on hinged directing-board $J^{23}$, pivoted at $J^{24}$, by means of brackets $J^{12}$, onto beams $J^4$, and having lever $J^{13}$ and staples $J^{14}$, to which the ends of an endless chain, (shown broken at $J^{16}$ and $J^{17}$,) are attached, having passed once, twice, or oftener, around a barrel $J^{18}$, Figs. 5 and 1, (having a ratchet-motion attachment) on plate $G^4$ of elevator-frame. The revolution of this barrel $J^{18}$, by means of a ratchet-handle, adjusts the inclination of directing-board $J^{23}$, so that the discharge may be deposited away from, close to, or under the roller $J^7$, as is easily seen by reference to Figs. 1 and 5. Chains $J^{19}$ extend from bracket $J^{12}$ to the top plate $G^9$, and support the outer end of beams $J^4$, the length of these chains $J^{19}$ being regulated by shackle attachment on links, as may be desired, or in any other suitable manner.

When the discharge-frame, consisting of parts just described, is not required, or when it is desired that the machine should move itself for any considerable distance, the spindle $J^3$ is withdrawn and the chains $J^{16}$, $J^{17}$, and $J^{19}$, being freed, the whole frame may be temporarily removed and placed in a convenient position on or across the machine, or may be transported separately. On one end of spindle $J^3$ is a bevel-wheel $J^{20}$, in gear with a bevel-wheel $K^3$ on the main shaft K of the machine, while on the other end of said spindle $J^3$ is a toothed wheel $J^{21}$, gearing with idle-wheel $J^{22}$, (whose pivot is held in bracket $J'$,) which in turn gears with toothed wheel $H^{10}$ and revolves spindle $H^x$ of the roller $H^8$ for imparting the traveling motion to belt H.

Rearwardly of the transverse hopper (with traveling bottom H) and discharge traveling belt J, is the main shaft K of the machine, with other gearing to be described, and rearwardly again on one side is double cylinder-engine N, of approved design, preferably provided with reversing-gear, while on the other side is an upright boiler O. Rearwardly of the engine is a water-tank P and rearwardly of the boiler is a fuel-bunker Q.

The crank-shaft $N'$ of the engine has thereon fly-wheel $N^2$ and toothed pinion $N^3$, this latter gearing into toothed wheel $K^2$ of the main shaft K, carried in bearings $K'$ on side girders $A^2$ and $A^3$ and subsidiary girder $A^8$. (See Figs. 1 and 2.) On one end of this main shaft K is bevel-wheel $K^3$, gearing with bevel-wheel $J^{20}$, having clutch $K^4$ and clutch V-lever $K^5$, while on the other end of the shaft is chain pulley or sheave $K^6$, for endless-chain belt $G^{32}$, having clutch $K^7$ and clutch V-lever $K^8$. The bevel-wheel $K^3$, through bevel or miter wheels $J^{20}$ and $J^{10}$ on spindles $J^3$ and $J^9$, give motion to the side discharge-belt J through its rollers $J^5$ and $J^7$, while sprocket-wheel $K^6$ gives motion to elevator, as above described. Cross-rods $K^9$, Fig. 2, join levers $K^5$ and $K^8$ to actuating pull-rods $K^{10}$ in standard bearings or guides $K^{11}$ for simultaneously disengaging the elevator-driving mechanism and the discharge traveling-aprons mechanism from the main shaft K and stopping them, while the said shaft K still revolves, as in moving or traveling the machine. On the main shaft is a loose eccentric $K^{12}$, with clutch-connection $K^{13}$, with V-lever $K^{14}$, and pull-rod $K^{15}$, for putting the said eccentric $K^{12}$ in or out of gear with said shaft. The eccentric-strap has a rod $K^{16}$, whose outer end is connected with crank $F^x$ of shaft F, to which is thus imparted a rocking motion. On said rocking shaft F is a second crank $F^2$, to which is jointed a connecting-rod $F^3$, whose other end takes on a rocking lever $F^4$ on pivot-pin $F^5$ in bearing $F^6$. (See Fig. 6.) This lever has adjustment-holes for the connecting-rod pin and carries a weighted pawl $F^7$, gearing in ratchet-wheel L loose on the main shaft K, but having a clutch-connection $L'$ between itself and a toothed wheel $L^3$, also loose on shaft K, but having clutch-connection $L^4$ therewith, the clutch part $L'$ being feathered on hub of ratchet L.

$L^2$ and $L^5$ are clutch-rods on push-bar $L^6$ in guides $L^7$ and having lever-rod $L^8$, lever $L^9$, and pull rod and handle $L^{10}$, Fig. 2, the movement being so arranged that ratchet-wheel L must be disengaged from toothed wheel $L^3$ when the latter is engaged with shaft K. The toothed wheel $L^3$ gears with toothed wheel $M^3$ on intermediate shaft M, in suitable bearings on side girder $A^3$ and subsidiary girder $A^8$, respectively, and said wheel $M^3$ also gears with toothed wheel $M^4$ on the main axle $B^x$, so as to revolve the main draft-wheels B. (See Figs. 1, 2, and 6.) The motion of wheel $L^3$ thus moves the machine, whether such motion is derived from the slow motion of ratchet L by means of rod $F^3$ from rocking shaft F, (which slow motion is used when the machine is at work,) or from the comparatively faster motion of shaft K, when, by clutch-connections $L'$ and $L^4$, ratchet-wheel L is disengaged from wheel $L^3$ and that wheel is engaged with shaft K, which faster motion is used when the machine is required to move from place to place. The radial horn-plates $B^2$, containing the axle-boxes $B^3$, are struck from the center of wheel $M^3$, and thus allow of the free raising and lowering of the machine on the axle, as required and as hereinbefore described.

The various movements of the specific parts and their respective functions will be readily understood from the foregoing detailed description, and suffice it now to say that in operation, the engine N being started and the clutch push-rod $L^{10}$ being placed in its forward position, the main shaft K is revolved, so that the eccentric $K^{12}$, geared by clutch $K^{13}$ to said shaft, actuates by means of rod $K^{16}$ and crank $F^x$ the intermediate rocking shaft F. This rocking shaft, as before described, imparts rotary motion to the shaft or spindle $E^x$, carrying the picks E, which, striking downwardly upon the ground, pick or excavate to a facing therein, as shown in Fig. 1, and push the excavated material rearwardly between the cheeks $G^{12}$ and disks $G^{18}$. At the same time the rocking shaft F, by means of crank $F^2$, rod $F^3$, and pawl $F^7$, revolves ratchet-wheel L, which, being rigidly connected with toothed wheel $L^3$, causes the latter, in gear with wheel $M^3$, to revolve, by means of wheel $M^4$, the main axle $B^x$, so that the whole machine will slowly advance and "feed" the revolving picks forward into the facing upon which they work. The motion of the main shaft K, by means of clutch $K^7$ in gear with sprocket-wheel $K^6$, is given to chain $G^{32}$, which in turn imparts it, by means of sprocket-wheel $G^{31}$ on shaft $G^x$, to the tumbler $G^{20}$ of elevating-buckets $G^{23}$, which buckets are thus caused to pick up the excavated material as they pass around roller $G^{17}$ and to discharge it, assisted by the hinged flaps $G^{29}$, as they pass over said tumbler. At the same time the clutch $K^4$ locks miter-gear $K^3$ to said main shaft K and transmits the motion of the latter to the roller $H^3$ for hopper-bottom belt H through miter-gears $J^{20}$ $J^{10}$, and the latter through spindle $J^9$ and miter-gear $J^{11}$ impart motion to the discharge-belt J, the endless belts or aprons H and J discharging the spoils at the side, as before clearly set out.

Referring to Figs. 13 to 18, inclusive, I will now describe the modified construction of some of the parts of my invention hereinbefore referred to, which modifications are equally as serviceable as those parts described with reference to Figs. 1 to 12. To the subsidiary girders or bearers $A^{12}$, which join up the end girder A' and cross-girders $A^{11}$, Figs. 2, 13, 14, and 15, are bolted brackets R, carrying female screwed blocks or nuts R', through which pass male screws S' of vertical spindles S, stepped in bearings or sockets on top and bottom frames $S^2$ and $S^3$, respectively, said frames connected by vertical side frames $S^4$, said bottom frame $S^3$ carrying the king-bolt $C^8$, which passes through the chain-quadrant $C^{10}$, axle or bogie $C^x$, and through socket end of the frame $C^3$, so that when said quadrant $C^{10}$ is moved around by means of chains $C^{11}$ the axle or bogie $C^x$ and wheels C will turn king-bolt $C^8$, and so steer the machine as it travels on its main wheel and bogie-wheels C. The vertical spindles S are revolved by worm-wheels $S^5$, with which gear worms $S^6$ on spindle $S^7$ in bearings on frames $S^4$, and revolved by gearing of worm-wheel $S^8$ with worm $S^9$, which latter is actuated by hand-lever $S^{10}$. The revolving of spindles S causes the nuts R' to screw up or down male screw S', and so raise or lower the girders or bearers $A^{12}$ and the end of the main framing of the machine, which, moving on the main axle as a fulcrum, raises or lowers the front or excavating end of the machine from and to its work.

Figure 16:
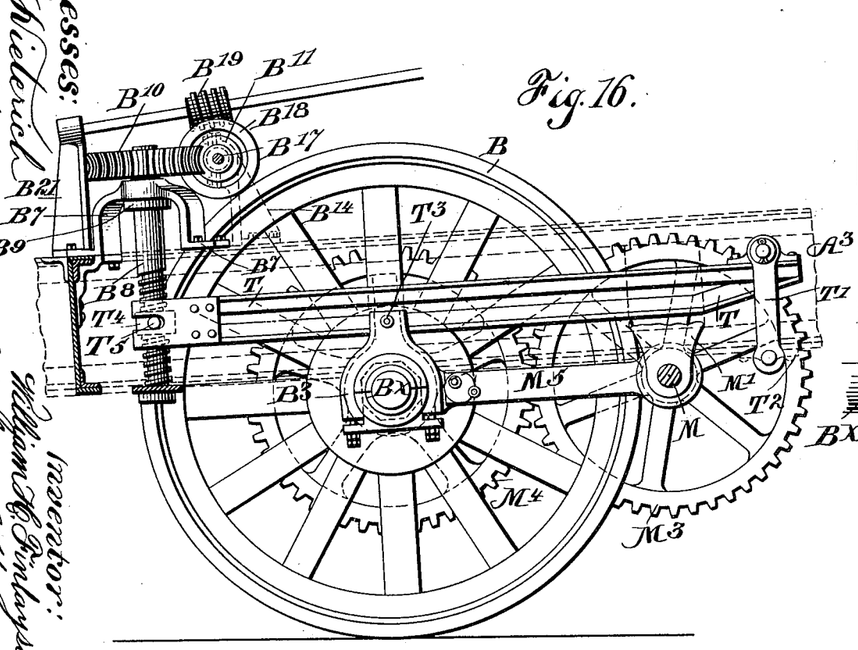
Figs. 16 and 17 are views similar to Figs. 6 and 7, illustrating structural modifications.
Figure 17:
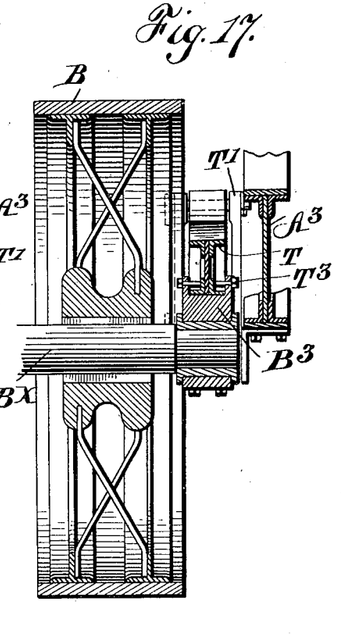

The modified constructions of devices for raising and lowering the main frame above the main axle and adjusting it as to its height from the ground are shown in Figs. 16 and 17. On either side is a beam or lever T, whose back end is held by links T' to a bracket $T^2$ on the under side of each of the side frames (one of which is shown in dotted lines) of the machine. This beam rests upon the axle-box $B^3$ of the main axle $B^x$, and is held thereto by bolt $T^3$, and this axle-box $B^3$ is radially held to shaft M, by means of links $M^5$ therefrom. The forward end of said beam is bifurcated to take a block or nut $T^4$, having trunnions $T^5$, taking into grooves at end through a female screw in block or nut $T^4$, passes male screw $B^8$, having collar $B^9$ under bridge piece or bracket $B^7$, and also having a worm-wheel $B^{10}$, gearing into which is a worm or endless screw $B^{11}$ on cross-spindle $B^{17}$ in bearing-brackets $B^{14}$, (one of which is shown by dotted lines,) said spindle $B^{17}$ carrying worm-wheel $B^{18}$, in which gears worm or endless screw $B^{19}$ on spindle $B^{20}$, carried by brackets $B^{21}$, and terminating in hand-wheel placed convenient to the driver, as shown also in Figs. 1, 2, and 6. The revolution of this hand-wheel, by means of the gearing just described, revolves screw $B^8$ in female screw in nut $T^4$, causes said male screw to move up or down in said block, and so raises or lowers the main frame from the axle $B^x$ and the wheels B, and thus the height of said frame from the ground is adjusted.

Figure 18:
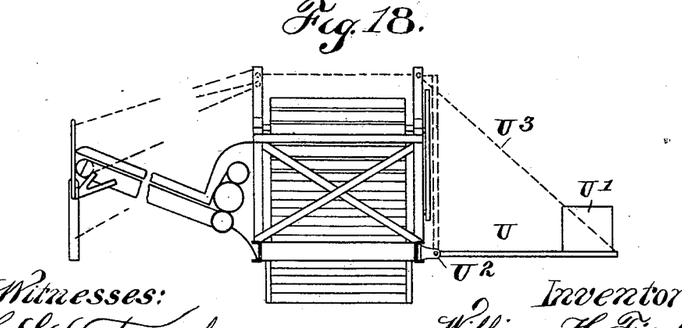
Fig. 18 is a front view of a portion of the elevator and side discharge, illustrating modifications in the means for adjusting the discharge chute or apron.

Referring to Fig. 18, the lever U may be a a single bar or may be a frame strong enough to carry a water-tank, such as U', or any kind of weight on its outer end sufficient to counterbalance the weight of the discharge-elevator extending from the other side of the machine, and thus prevent the excavating implements digging deeper on one side than the other, and so working the machine on a slant. This lever is hinged at $U^2$ to the main frame, so that when not in use, as when in transit from place to place, said lever U may be raised to the position shown by dotted lines by means of chains $U^3$, the tank or weight being then placed where convenient on the main frame of the machine.

Having thus described my invention, what I claim as new therein, and desire to secure by Letters Patent, is—

1. An excavator comprising a truck, a revoluble cutter shaft at the forward end thereof, an elevator for the spoils in rear of and parallel with the cutter shaft, said elevator composed of traveling scoops, a hopper for the reception of the spoils, extending across the truck in rear of the elevator and a traveling bottom for said hopper, a receiving apron outside of the truck and forming a continuation of the traveling hopper bottom, a discharge chute adjustably supported at the outer end of the receiving apron, a steam engine, boiler, coal bunker and water tank, and mechanism operated from the engine adapted to impart motion to the truck, the excavating, and spoils discharging devices, said elements mounted on the truck, substantially as set forth.

2. An excavator comprising a truck, a revoluble cutter shaft at the forward end thereof, an elevator in rear of the cutter shaft consisting of parallel traveling scoops, a receiving hopper extending across the truck above the same, a traveling bottom for said hopper, a receiving apron outside of the truck and forming a continuation of the traveling hopper bottom, a pivotal connection for one end of said receiving apron, an adjustable chute at the outer end of the receiving apron, and mechanism carried on the truck for imparting motion to the same and to the excavating and spoils discharging devices, substantially as and for the purpose set forth.

3. An excavator, comprising a truck, drive wheels located about the longitudinal center of said truck, a bogie supporting the rear end of the truck, a water tank on one side and a coal bunker on the opposite side at the rear end of such truck, a steam engine in front of the water tank, a boiler in front of the coal bunker and in rear of the main wheel axle, excavating implements at the forward end of the truck, and elevating and discharging mechanisms intermediate of the last-named devices and the engine and boiler, in combination with mechanism operated by the engine for imparting motion to the excavating, elevating and discharging devices and to the truck, for the purpose set forth.

4. An excavator comprising a truck composed of a pair of drive wheels and a frame pivotally mounted and vertically adjustable on the axle thereof, a revoluble cutter shaft at the forward end of the truck, a bogie frame at the rear end of such truck, a pivotal connection between the two frames, mechanism for imparting a slow forward motion to the truck, and mechanism for elevating and depressing the forward end of the truck frame by tilting the same on the drive wheel axle, for the purpose set forth.

5. An excavator, comprising a truck composed of a pair of drive wheels and a frame loosely mounted and vertically adjustable on the axle thereof, a revoluble cutter shaft at the forward end of the frame, a bogie frame at the rear end of said truck frame, said rear end weighted to normally hold the excavating implements above the surface of the ground, and mechanism for depressing the forward end of the frame by tilting the same on the drive wheel axle without altering the position of the bogie, means for holding the frame in its depressed position, and mechanism for imparting a slow forward or feed motion to the truck, for the purpose set forth.

6. In an excavator, the combination with the truck comprising a pair of drive wheels, a wheel axle, and a suitable frame pivotally mounted about midway of its length on said wheel axle, excavating and spoils discharging appliances on said truck in front of the wheel axle, the rear end of said frame weighted to normally hold the excavating appliances above the surface of the ground, of a bogie from which the rear end of the truck frame is suspended, a pivotal connection between the bogie and truck frames, and means for lowering the forward end of said truck frame and holding the same in its lowered position, for the purpose set forth.

7. In an excavator, a truck composed of a pair of drive wheels and a truck frame pivotally connected with and vertically adjustable on the drive wheel axle, and carrying the excavating devices, of a bogie from which the rear end of said frame is adjustably suspended, for the purpose set forth.

8. An excavator comprising a wheeled truck, excavating implements at its forward end, an elevator in rear of said implements, a carrier having motion at right angles to that of the elevator and adapted to receive the spoils discharged therefrom, and a counterbalanced laterally projecting discharge apron adapted to receive the spoils from the carrier and discharge the same at a distance from the machine, substantially as set forth.

9. An excavator, comprising a wheeled truck, excavating implements at its forward end, a spoils elevator, a carrier adapted to receive said spoils, said carrier having motion in a plane at right angles to the plane of motion of the elevator, a traveling apron pivotally connected with the truck and extending laterally therefrom, said apron adapted to receive the spoils from the carrier and convey the same to a distance, a steam engine and boiler on the truck, intermediate mechanism for transmitting motion from the engine to the truck and to the aforesaid elements, and a water tank arranged relatively to the laterally traveling apron and its supports so as to counterbalance the same, substantially as and for the purpose set forth.

10. In combination with the shaft $E^x$ provided with a ratchet and pawl mechanism as $E^4$ $E^5$ $E^6$, the rock shaft F having crank $E^8$ connected to pawl lever $E^5$, the crank shaft N', the main shaft K geared to shaft N', an eccentric connection between main shaft K and rock shaft F, a pawl lever $F^3$ on said rock shaft, a ratchet wheel on the main shaft engaged by the pawl on said lever, said ratchet wheel loose on said main shaft, and suitable clutch mechanism for connecting the ratchet with its shaft, of the drive wheel axle and intermediate gearing connecting the same with the ratchet wheel, substantially as and for the purpose set forth.

11. An excavator comprising a truck composed of a frame adapted to carry all of the operating devices together with the motive power therefor, drive wheels and their axle from which said frame is pivotally suspended about midway of its length, and means for elevating and lowering and tilting the frame on said wheel axle, substantially as and for the purpose set forth.

12. The combination, with the crank shaft $N'$, the main shaft K geared thereto, a pinion loosely mounted at each end of said shaft, clutch mechanism for connecting said pinions with the shaft, a system of levers and rods as $K^5$ $K^9$ $K^{10}$, adapted to actuate both clutch mechanisms simultaneously, a gear wheel, as $L^3$ loose on main shaft, and a clutch mechanism for locking the same to said shaft, of the main drive wheel axle and intermediate gearing connecting the said axle with the gear wheel $L^3$, substantially as and for the purpose set forth.

13. In an excavator, the combination with the excavating device, of an elevator comprising parallel rows of traveling chains composed of links as $G^{22}$ and suitable connecting rods, of sector shaped scoops as $G^{23}$, secured to said links, said scoops provided with the sharp lip $G^{27}$, the directing board $G^{28}$, and the hinged flap $G^{29}$, substantially as and for the purpose set forth.

14. In a portable excavator, the combination with the wheeled truck, the excavating implements, an endless belt carrier extending across the truck above its frame, and an elevator interposed between the carrier and excavating implements adapted to discharge the spoils onto said carrier, of a lateral discharge device comprising a suitable frame, a revoluble roll at each end thereof, the inner roll pivotally connected with the excavator framing, an endless apron on said roll forming a continuation of the afore-mentioned carrier belt, and means for varying the position of the outer roll relatively to that of the inner roll, substantially as and for the purpose set forth.

15. In a portable excavator, the combination with the excavating devices, an elevator adapted to take up and lift the spoils and a carrier having motion in a plane at right angles to that of the elevator, onto which carrier the spoils are dumped, of a lateral discharge device comprising a suitable frame work, a revoluble roll at each end thereof, the inner roll pivotally and detachably connected with the excavator framing, an endless belt on said rolls, means for varying the position of the outer roll relatively to that of the inner roll, a directing chute hinged below the outer roll, and means for adjusting said chute relatively to said outer roll, for the purpose set forth.

16. The combination with the excavator truck and the traveling hopper bottom H, of the side framing $J^4$ the roll $J^5$ and its spindle or journals $J^3$ extending through said side framing, said spindle revoluble in and detachable from bearings on the truck-frame, the roll $J^7$ pivoted at the outer end of framing $J^4$, and the traveling belt J, of the bracket $J^{12}$ secured to the outer end of the framing $J^4$, the chute $J^{23}$ hinged to said bracket below the outer roll, and adjusting devices, as chains and pulleys connected with the bracket and with the directing board and adapted to operate independently of each other in adjusting the position of the outer roll $J^7$ relatively to that of the inner roll $J^5$, and the position of the board $J^{23}$ relatively to said outer roll, for the purpose set forth.

17. In an excavator, the combination with the shaft $E^\times$, the rock shaft F, and mechanism connecting said shafts adapted to convert the rocking motion of the latter into rotary motion, and the drive wheel axle $B^\times$ having gear $M^4$, of the main shaft K, an eccentric $K^{12}$, a ratchet wheel L and a gear wheel $L^3$, all loose on said shaft, said eccentric and ratchet wheel connected with the rock shaft F to impart to the latter a rocking motion and convert said motion into rotary motion of the ratchet, gearing connecting gear $L^3$ with gear $M^4$ on the drive wheel axle, and clutch mechanism adapted to lock the eccentric, the ratchet and the gear $L^3$ to the main shaft K, or to lock said gear $L^3$ to ratchet L, substantially as and for the purpose set forth.

18. The combination with the drive wheel axle and its bearings, of the girt $A^3$ of the truck frame, the brackets $B'$, $B^6$, $B^7$, the segmental horn plates $B^2$ encompassing the axle bearings, a lifting screw working in said horn plates, and mechanism for revolving said screw, substantially as and for the purpose set forth.

19. The combination with the truck and a bogie at the rear end thereof, the framing of said bogie pivotally connected with the truck in proximity to its longitudinal center, of a block and tackle mechanism adjustably connecting the rear end of the truck frame to the bogie frame, substantially as and for the purpose set forth.

20. In an excavator such as described, the combination with the wheeled truck, the excavating implements, the hopper $H'$ $H^2$ $H^3$ $H^4$ extending across the truck frame above it, the endless traveling belt H forming the bottom for said hopper, the belt rolls $H^6$ $H^6$, the supporting rolls $H^9$ the gearing $H^{10}$ $J^{22}$ $J^{21}$, spindle $J^3$, a main driving shaft, and transmitting mechanism for transmitting the rotary motion of said shaft to spindle $J^3$, of a spoils elevator interposed between the excavating implements and the aforesaid hopper and adapted to discharge into the latter, substantially as described and for the purpose set forth.

21. In an excavator such as described, the combination with the discharge frame consisting of beams $J^4$ and traveling apron J, of a directing board or chute $J^{23}$, bracket $J^{12}$ to which said chute is pivotally connected at $J^{24}$, the lever $J^{13}$, chains $J^{16}$, $J^{17}$, guide rollers and the winding roller $J^{18}$, substantially as and for the purpose set forth.

22. In an excavator such as described, the combination with the wheeled truck, the engine shaft $N'$, the main driving shaft K driven from said engine shaft and the ratchet wheel L on said driving shaft, of the eccentric $K^{12}$, its rod $K^{16}$, rock shaft F, its crank $F^\times$ connected with eccentric rod $K^{16}$, the arm $F^3$ carrying pawl $F^7$ in engagement with said ratchet wheel L, and a clutch mechanism adapted to connect the aforesaid eccentric $K^{12}$ to and disconnect the same from the main shaft.

23. The combination with the ratchet wheel L of the rock shaft F and its crank $F^2$, of the arm $F^3$ pivotally connected with said crank at one end and provided at its free end with a cross-head $F^4$, and the weighted pawl $F^7$ adjustable along said cross head, substantially as and for the purpose set forth.

24. In an excavator such as described, the combination with the drive wheel axle $B^\times$ and its axle boxes $B^3$, the truck frame, the brackets $B'$ thereon, the radial horn plates $B^2$, the interiorly threaded pieces $B^5$ and bridge pieces $B^7$, of the screws $B^8$ having collars $B^9$, and means for revolving both screws simultaneously, substantially as herein described and for the purpose set forth.

25. In an excavator such as described, the combination with the truck frame, the drive wheels $B'$, and their axle $B^\times$, of the A-shaped bogie frame pivoted at $C^2$ to the truck frame and having legs $C^3$, the king bolt $C^8$, the bogie frame sprocket pulley $C^{10}$, the bogie wheels C, their axle $C^\times$, the frames $S^2$, $S^3$, $S^4$, the brackets R, the female screw $R'$, the male screws S and $S'$, the worm wheels $S^5$, the spindle $S^7$ carrying worms $S^6$ in gear with said worm wheels, and means for revolving the spindle $S^7$ in one or the other direction, substantially as herein described for the purpose set forth.

W. H. FINLAYSON.

Witnesses:
FRED WALSH,
THOMAS JAMES WARD.